United States Patent [19]

Hughes

[11] Patent Number: 5,100,202
[45] Date of Patent: Mar. 31, 1992

[54] LOW-CHUCK INERTIAL LATCHING MECHANISM FOR SEAT ASSEMBLIES

[75] Inventor: Daniel Hughes, Mississauga, Canada

[73] Assignee: Canadian A.S.E. Limited, Mississauga, Canada

[21] Appl. No.: 356,819

[22] Filed: May 24, 1989

[51] Int. Cl.⁵ ............................................. B60N 2/02
[52] U.S. Cl. .................................... 297/379; 297/216
[58] Field of Search ...................... 297/379, 378, 216

[56] References Cited

U.S. PATENT DOCUMENTS

| | | | |
|---|---|---|---|
| 4,103,967 | 8/1978 | Tanaka et al. | 297/216 |
| 4,118,067 | 10/1978 | Tanaka | 297/216 X |
| 4,318,569 | 3/1982 | Bilenchi et al. | 297/379 |
| 4,366,984 | 1/1983 | Klueting et al. | 297/216 X |
| 4,438,974 | 3/1984 | Kresky et al. | 297/379 |
| 4,707,010 | 11/1987 | Croft et al. | 297/379 |
| 4,720,145 | 1/1988 | Bell | 297/379 |
| 4,733,912 | 3/1988 | Secord | 297/379 |
| 4,836,608 | 6/1989 | Sugiyama | 297/379 X |
| 4,846,526 | 7/1989 | Allen | 297/216 X |

Primary Examiner—Jose V. Chen
Attorney, Agent, or Firm—Patrick J. Hofbauer

[57] ABSTRACT

An inertial backrest latching mechanism for use in a vehicle seat assembly having a backrest member pivotally tiltable over a seat member. The mechanism has a first latch fixed relative to the seat member and a second latch pivotally mounted on the backrest member for pivotal movement about an exceptionally low pivot pin between an unlatched and latched configuration, in which latched configuration tilting movement of the backrest member over the seat member is restrained. A terminal ramped camming portion of the first latch is steeply profiled to tilt the second latch into a latchable configuration when the backrest member is in the normal upright position.

10 Claims, 5 Drawing Sheets

LOW-CHUCK INERTIAL LATCHING MECHANISM FOR SEAT ASSEMBLIES

The prior art is exemplified by U.S. Pat. No. 4,318,569, issued to Robert Bilenchi et al on Mar. 9, 1982, which discloses the use of an inertial latching mechanism for a vehicle seat assembly having a generally horizontal seat member and an upstanding backrest member pivotally mounted on support arms for tiltable movement over the seat member. A latch pawl pivotally mounted on one of the seat or backrest members is maintained in a cam controlled latching attitude relative to a fixed detent on the other of the members. The latch pawl is constructed and arranged so that its centre of gravity normally provides a force couple acting eccentrically of the pawl pivot axis to cause the latter to swing out of the controlled latching attitude in a direction to by-pass the detent when moderate force is applied to the backrest member to tilt the latter over the seat member. Upon the occurrence of a vehicular deceleration rate sufficient to overcome the inertia of the backrest member normally resisting tilting movement of the latter over the seat member, the inertial latch pawl becomes a factor in causing the latch pawl to engage the detent to prevent further tilting movement of the backrest member.

The Bilenchi inertial latch has been used commercially, but such use has emphasized several serious problems with its design. More specifically, when the backrest member is in the normal upright position, the latch pawl is cammed into a latching attitude which overcomes the gravity unlatching bias. However, upon downward inclination of the nose of the vehicle, as when parked on a hill, the centre of gravity of the latch pawl shifts relative to its pivot in a direction decreasing the force couple responsible for gravity unlatching actuation, such that, where the downward inclination of the vehicle is over approximately 13°, the latch pawl fails to dependably accommodate forward tilting of the backrest member.

One attempt to overcome the problem of undesirable inclined latching is proposed by U.S. Pat. No. 4,438,974 issued on Mar. 27, 1984, to Fred C. Kresky et al. The Kresky Patent teaches the use of an improved camming guide profile designed to reduce the clearance between the forward lobe of the latch pawl and the adjacent detent portion of the co-operating latch element so as to reduce the amount of radial free-play the locking mechanism, which excessive free-play contributes to inclined latching. While some improvement in inclined unlatching performance is observed with the Kresky latch mechanism, the radial free-play inherent in this design is still sufficient to cause reliability problems.

Excessive levels of radial free-play (sometimes referred to herein as "chuck") of the backrest member over the seat member is unacceptable from several operative standpoints. Under rapid deceleration of the vehicle, the Bilenchi and Kresky devices allow radial free-play of the backrest of between 8°-11° before latching. Radial free-play of this magnitude is, in an unoccupied seat, both annoying and distracting to the vehicle driver. Moreover, in an occupied seat, such radial free-play causes excessive kinetic energy to be transferred from the seatback member to the occupant before latching. Such energy transfer has been shown to significantly increase the likelihood of injury to the seat occupant in crash situations. Public safety groups in North America have, in recent years, been raising this safety concern in relation to the use of inertial latches for automotive seat assemblies so that original equipment manufacturers of automobiles (hereinafter, OEM) are currently seeking faster acting (i.e. lower chuck) inertial latches for improved safety.

A considerable advance over the prior art is shown in U.S. Pat. No. 4,707,010 issued to George Croft et al. on Nov. 17, 1987. The Croft device not only improves inclined latching and unlatching performance, but significantly reduces the excessive chuck problems of the prior art devices, so as to improve the safety thereof. The Croft latching device replaces the unitary latch pawl of the prior art with a separate latching pawl and a pendulum means, pivotal about a common axis. This arrangement allows for a dynamic centre of gravity for the latch pawl/pendulum combination, which centre of gravity is positioned for optimal unlatching performance below a specified deceleration rate (so as to improve inclined unlatching performance), and which shifts, above the threshold deceleration rate, to a position designed for optimal latching performance, so as to allow closer design tolerances, thereby reducing the inherent chuck of the device. While the Croft inertial latching device demonstrates a significant improvement in performance over prior art inertial latching devices, it is a device which must be manufactured to close tolerances adding to its costs, so that it has not received widespread commercial acceptance by OEM companies.

It is an object of the present invention to provide an improved inertial latching device mechanism which overcomes the above-mentioned difficulties associate with prior art inertial latching mechanisms. This is achieved by mounting the latch pawl for pivotal movement about an exceedingly low pivot axis and by providing the latch pawl with a raised ramp portion of novel profile adapted to provide for faster "dropping-off" of the latch pawl from the ramp portion during relatively slow (i.e. moderate) forward tilting of the backrest member over the seat member, thus enhancing the unlatching performance of the device. This faster dropping-off performance also allows for closer placement of the detent member, which member latchingly engages the latch pawl, so as to substantially reduce the amount of inherent chuck in the device.

The exceedingly low placement of the latch pawl axis results in the generation of a comparatively large unlatching force couple, when compared with a latch pawl of similar dimensions having a higher axis placement. The lower force couple contributes to faster unlatching performance, with a resultant reduction in inherent chuck as previously discussed.

The raised ramp portion is preferably profiled so that its upper extent substantially attains the same height as the pivot axis of the latch pawl, when the backrest member of the seat assembly is in its normal upright position. This relationship has been found to produce particularly desirable latching and unlatching performance.

It is a further object of the present invention to provide a low chuck inertial latching device which is not only fast acting in its latching and unlatching performance, but which is compact, simple and inexpensive to manufacture and assemble. In this regard, the utilization in a preferred embodiment of the invention of a single stop pin interacting with a closed slot formed in the latch pawl eliminates the need for two separate stop pins to limit the pivotal travel of the latch pawl, as is required in the prior art, and thus not only reduces the overall size of the latching mechanism, but also simplifies its design and assembly by reducing the number of parts otherwise required.

A low chuck inertial latching device embodying the present invention is particularly adapted for use in a vehicle seat assembly having a backrest member pivotally tiltable over a seat member. The latching mechanism of the invention comprises a first latch means fixed relative to one of the backrest and seat members and a second latch means pivotally mounted on the other of said members for pivotal movement about a pivot axis lying immediately adjacent to a lower edge of the second latch means. Such mounting of the second latch means provides for pivotal movement of a second latch means between a first limit position in which the second latch means is positioned so as to avoid latching engagement with the first latch means upon forward tilting movement of the backrest member over the seat member and a second limit position in which the second latch means is positioned to latchingly engage with the first latch means upon initial forward tilting movement of the backrest member over the seat member.

In a preferred embodiment, a stop means, such as a steel pin, is mounted on the other of the members in operative protruding relation through a closed slot formed in the second latch means above the level of the pivot axis, the stop means being adapted to interact with the closed slot to define the aforementioned first and second limit positions. When the backrest member is manually tilted forward over the seat member in moderate fashion (i.e. as opposed to violent pushing, kicking etc.), the second latch means is gravity biased to the first limit position. However, upon the occurrence of a vehicular deceleration force which is sufficient to overcome the gravity biasing of the second latch means to the first limit position, and which is sufficient to cause initial forward tilting of the backrest member over the seat member, the second latch means pivotally moves to the second limit position, thereby latchingly engaging the first latch means, so as to prevent continued forward tilting movement of the backrest member over the seat member.

In order that the invention may be readily understood and its objects more fully appreciated, one embodiment thereof will now be described, by way of example only, with reference to the accompanying drawings in which:

FIG. 1 appears with FIG. 5) is a perspective view of vehicle seat assembly having a seat member and a backrest member pivotally tiltable over the seat member, and further having a latching mechanism in accordance with the present invention mounted thereon, the backrest member being shown in the normal upright position;

Figure 1:
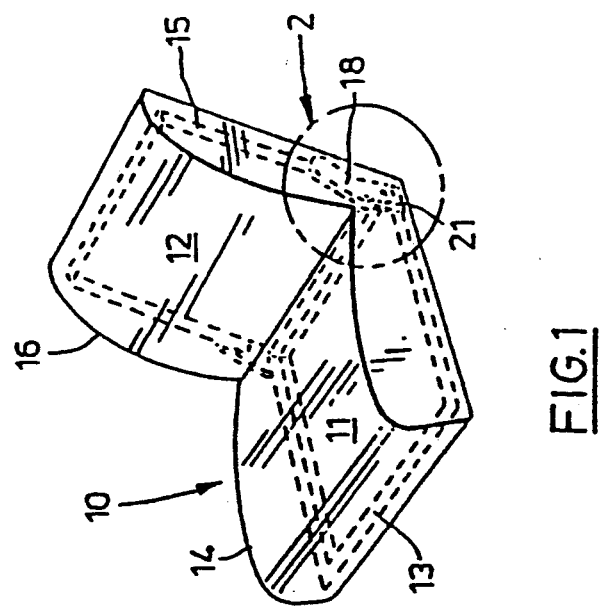

FIG. 1 shows in diagrammatic fashion a vehicle seat assembly 10 of the so-called "bucket" type, with which the invention may be used. Such seat assembly may, optionally, be of the well-known multi-occupant "bench" type. In this latter case, it is preferable to use one latching mechanism according to the invention at each of the two sides of the "bench" type seat assembly. With "bucket" type seat assemblies, as shown, it is generally sufficient to use a single latching mechanism for each seat assembly 10 installed, although, in particular applications, it may be desirable to use a latching mechanism according to the invention at each of the two sides of the "bench" seat assembly 10. For simplicity of description, the preferred embodiment described herein will be with reference to installation of a latching mechanism on one side of the seat assembly 10, only, as shown in the circled area 2 of FIG. 1, although it will be expressly understood by those skilled in the art that specific vehicle applications may call for the analogous use of two or more latching assemblies with each vehicle seating assembly 10.

The vehicle seat assembly 10 of the Figures has a seat member 11 and a backrest member 12 which is pivotally tiltable over the seat member 11. The seat member 11 comprises a seat support frame 13 which is conventionally anchored in a fore-aft adjustment mode to the floor panels (not shown) of the vehicle and is covered in a conventional manner with upholstery materials 14. The backrest member 12 comprises a support frame 15 which is also covered in a conventional manner with upholstery materials 16. A hinge plate 17 is rigidly affixed to the backrest support frame by bolts, rivets or other fastening means (not shown) or, alternatively, the hinge plate 17 may be a flattened downward extension integral with support frame 15. A cover plate 18 is affixed to the hinge plate 17 by means of pivot bolts 19 and 20 and serves to locate and assist in mounting of various other pivot pins and bushings which will be described in more detail below. It will be appreciated that the hinge plate 17 may, in place of the arrangement shown, be integrally formed with the support frame 15, or may be attached thereto by welding or any other suitable affixation means. Throughout this description of the preferred embodiment of the invention it will be apparent to those skilled in the art that additional rivets or other fastening means not illustrated in the drawings might desirably be added to give additional rigidity to the latching mechanism of the invention. However, as the number and placement of such fastening means is a matter of routine design choice, they have been omitted in order to simplify the drawings.

The first latch means, comprising a latch plate 21, is rigidly affixed against rotation to the support frame 13 by means of bolts 22 or other conventional fastening means. A hinge pin 23 acts as a pivot for the hinge plate 17 and the attached backrest frame 15. The hinge pin 23 passes through a bushing 24 positioned in the hinge plate 17, through an aligned bushing 25 mounted in the latch plate 21 and thence through a bushing 26 in the cover plate 18. A "C" clip retainer 27 engages a circumferential grove 29 on the hinge pin 23 to retain the assembly in operative position. In this manner, the first latch means 21 is fixed relative to the seat member 11.

The second latch means, generally designated by the reference numeral 31, and comprising a latch pawl 32, is pivotally mounted on the hinge plate 17 of the backrest member 12 by means of a shouldered pivot pin 33, which serves as a pivot axis for the latch pawl 32. The pivot pin 33, preferably of hardened steel, has an enlarged central diameter portion 34 which passes through a correspondingly diametered aperture 35 in the latch pawl 32, to allow free pivotal movement of the latch pawl 32 thereabout. A smaller diametered end portion 36 is present at each end of the pivot pin 33, each of such end portions 36 being mounted in a respective one of aligned apertures 37, positioned one each in the hinge plate 17 and the cover plate 18. The central portion 34 of the pivot pin 33 is somewhat wider than the thickness of the latch pawl 32, so as to leave clearance between the hinge plate 17 and the cover plate 18 thereby to allow free pivotal movement of the latch pawl 32. Spacers, such as nylon washers, (not shown) may be used as necessary for the reduction of friction between the various moving components of the device, such as is well known in the art.

Figure 2:
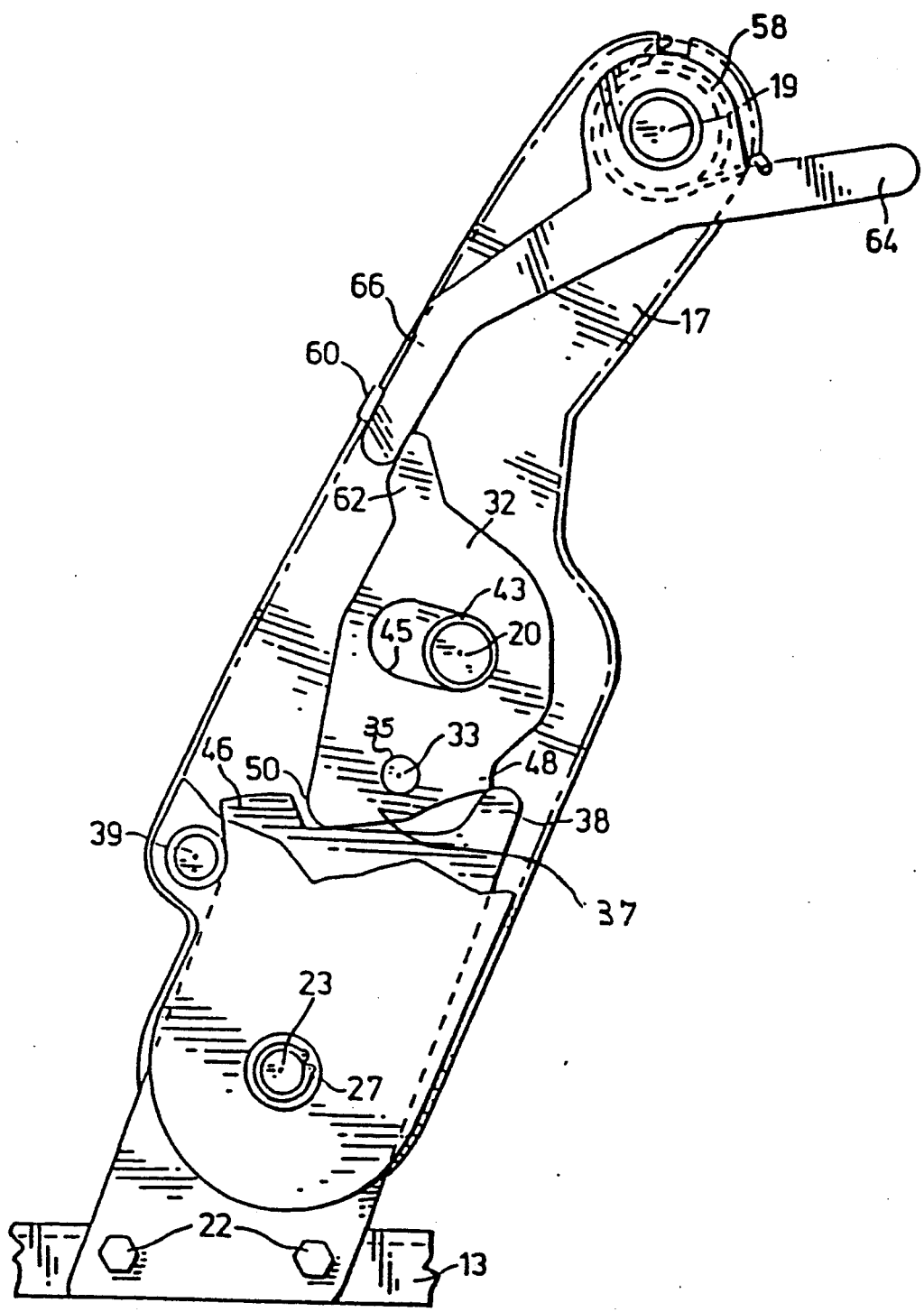
FIG. 2 is a fragmentary partial side elevational view of a latching mechanism according to the invention.
Figures 6, 7:
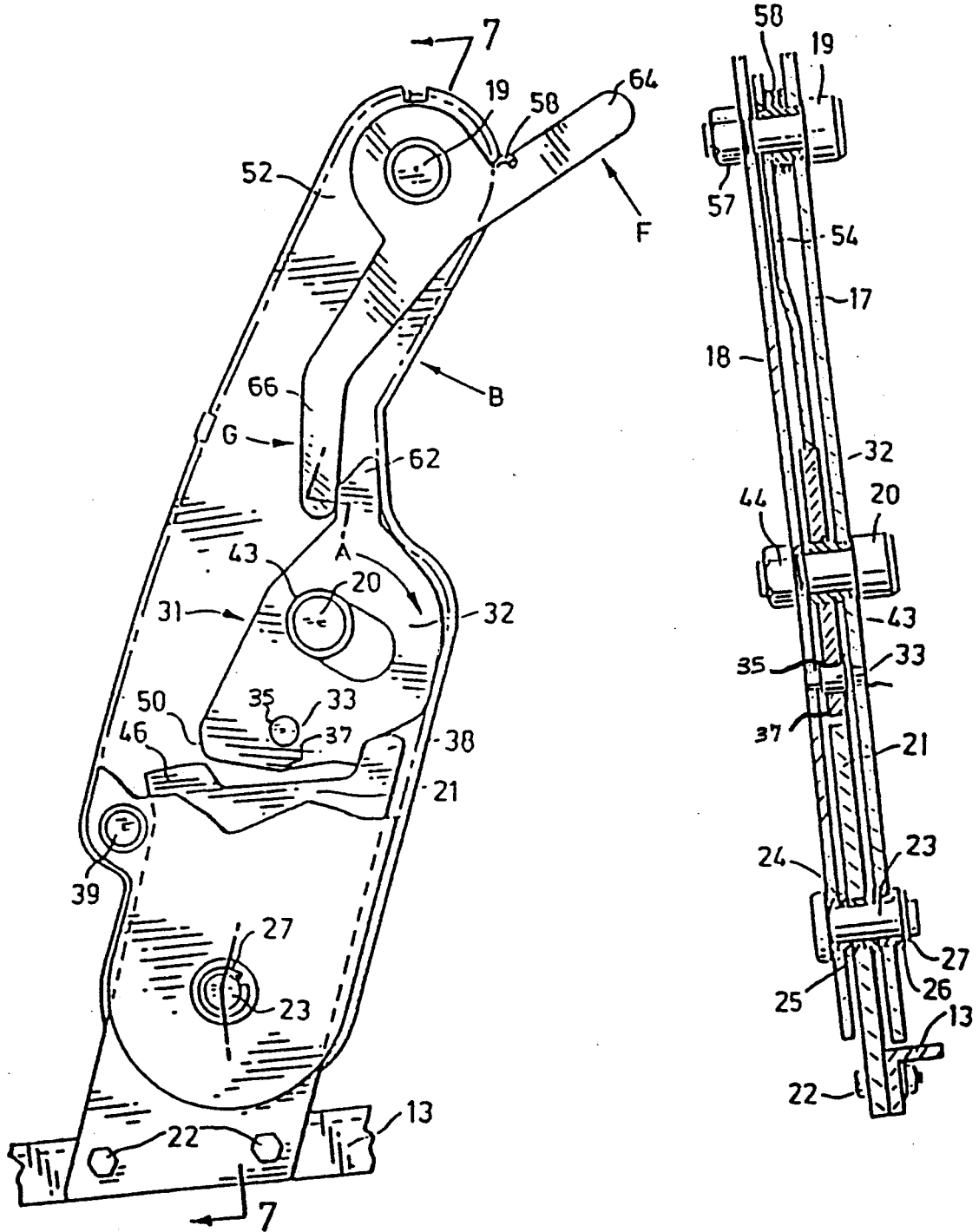
FIG. 6 is a view similar to FIG. 2, illustrating the use of the preferred latching mechanism of FIGS. 1-5 in conjunction with a manual release means.
FIG. 7 is a sectional view along line 7—7 of FIG. 6, and is shown as a projection of FIG. 6.
Figure 8:
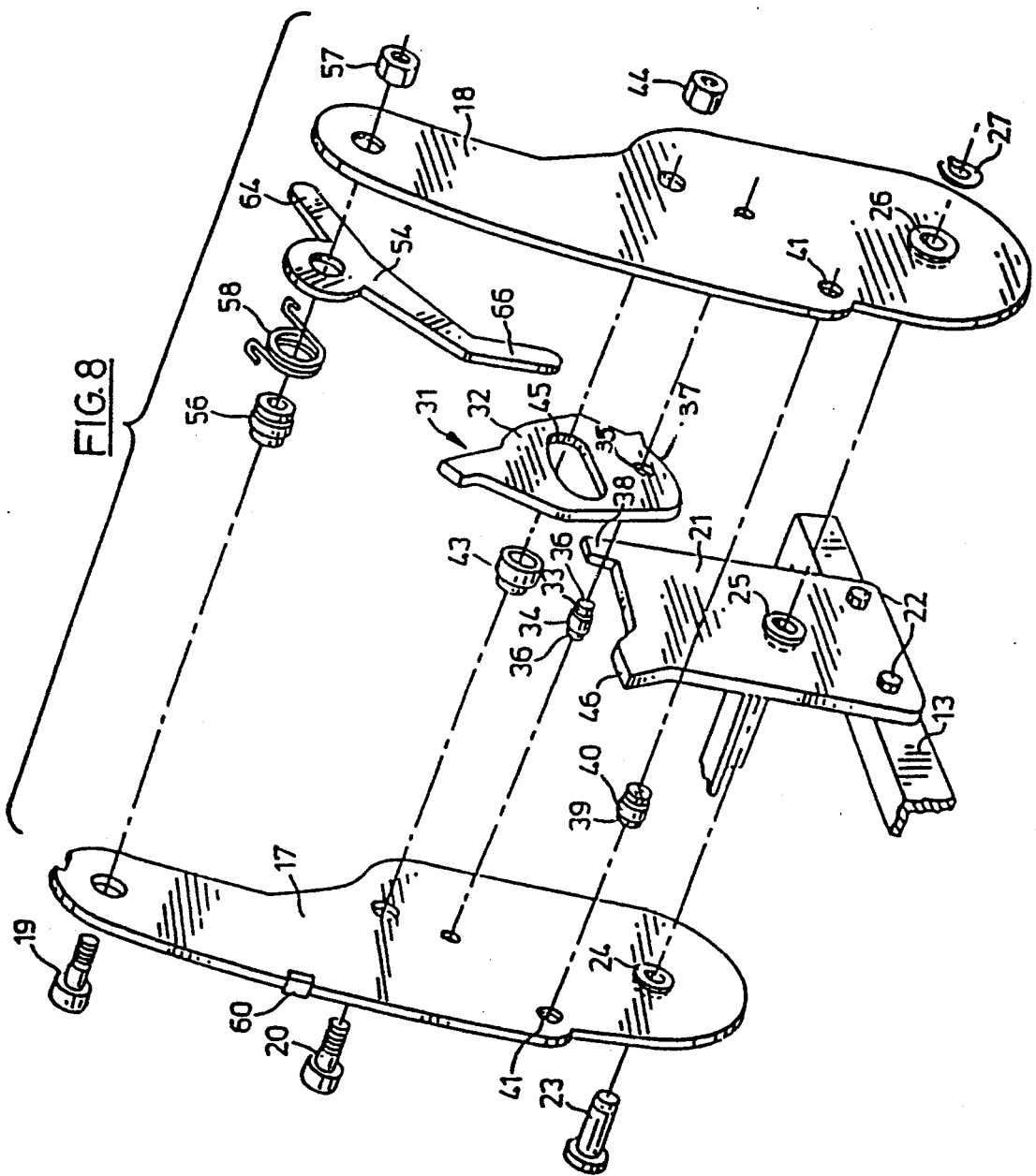
FIG. 8 is and exploded view of the latching mechanism of FIGS. 1-7.

The pivot axis of the latch pawl 32, which is defined by the positioning of the aperture 35 in the latch pawl 32, is immediately adjacent to a lower edge 37 of the latch pawl 32. Such positioning of the pivotal axis of the latch pawl 32 allows for greater over-center mass positioning, which, in a latch pawl 32 of given dimensions, generates under the influence of gravity a greater counter rotational moment causing movement of the pawl in the unlatching direction of arrow A in FIG. 6. This in turn allows for a steeper profiling of the raised ramp portion 38 (commonly referred to as a "turkey spur") of the latch plate 21, as the larger counter-rotational moments thus generated ensure positive movement of the latch pawl 32 from its latching attitude as shown in FIG. 2 to its unlatching attitude as shown in FIG. 6 (commonly referred to as "dropping off" of the latch pawl) when the backrest member 12 is tilted under moderate tilting forces. This resulting improvement in unlatching performance allows for closer design tolerances to be built into the mechanism with the result of less inherent chuck. Moreover, the lower positioning of the latch pawl pivot axis maximizes the forwardly directed inertial forces tending to cause the latch pawl 32 to engage the latch plate 21 under conditions of rapid deceleration (i.e. in panic stop situations), as it minimizes the magnitude of the unlatching inertial forces (i.e. forwardly directed forces directed under the pivot axis of the latch pawl 32) with a resulting improvement in latching performance. This positioning of the pivot pin 33, together with the novel profiling of the raised ramp portion 38 allows an inherent chuck for latching devices according to the invention of approximately 3°-5°. This can be compared with the prior art devices of Kresky et al. and Blenchi et al., with which chuck is between 8° and 12°.

A backrest stop pin 39, having a larger diametered central portion 40, is preferably mounted between the hinge plate 17 and the cover plate 19 by means of aligned apertures 41 in a manner analogous to the pivot pin 33. This stop pin engages a leading edge 42 of the latch plate 21 so as to limit rearward pivotal travel of the backrest member 12. In this manner, contact of the stop pin 40 with the leading edge 42 defines a normal upright position of the backrest member 12, as shown in FIG. 2.

Figure 5:
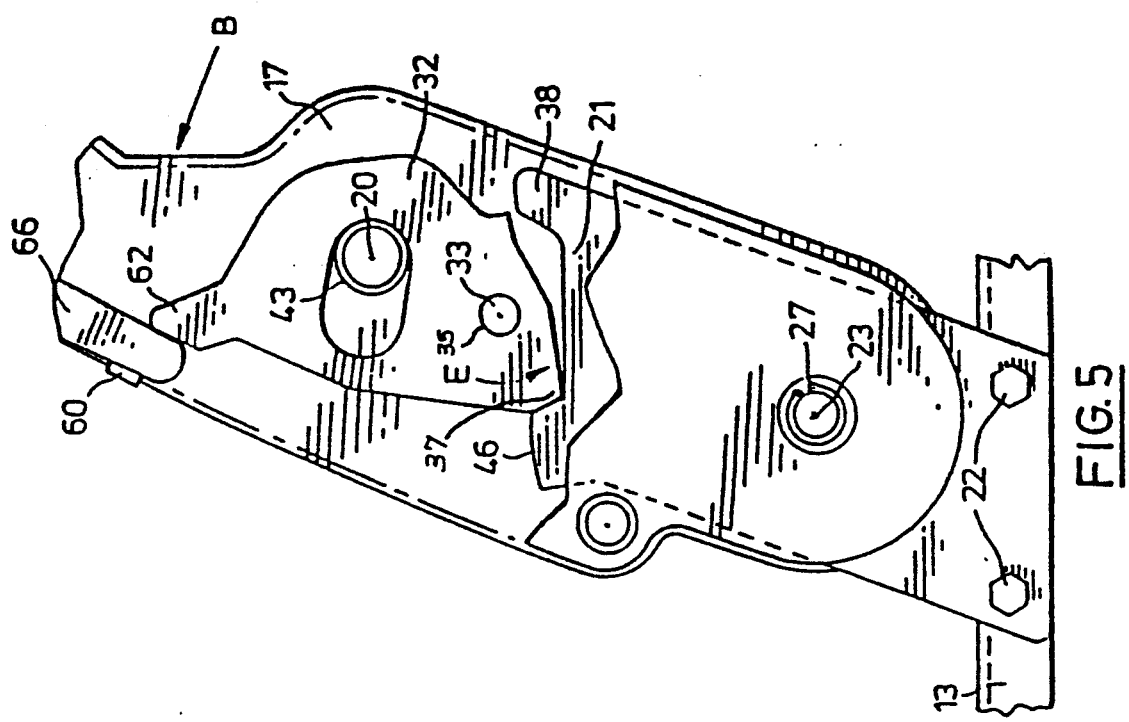
FIGS. 3, 4 and 5 are views similar to FIG. 2, showing the latching mechanism in different operative positions.

A pawl stop means, in the form of a hardened steel sleeve 43 is mounted on the backrest member 12 by means of a bolt 20 passing through the hinge plate 17, the sleeve 43 and the cover plate 18, being held thereagainst by means of an engaging nut 44. The bolt 20 may be replaced by a pin, a rivet or other analogous support means for the sleeve 43, or, indeed, the use of a separate sleeve may not be necessary where a hardened steel pin or rivet is used. The sleeve 43 is, in this manner, mounted on the seat member 12 in interfering relation with the latch pawl 32 above the level of the pivot pin 33 and is thereby adapted to interact with the latch pawl 32 to define a first limit position (shown in FIGS. 3 and 4) in which the latch pawl 32 is positioned so as to avoid latching engagement with a detent portion 46 of the latch plate 21 upon moderate forward tilting movement of the backrest member 12 over the seat member 11, as indicated by arrow C of FIG. 3, and a second limit position (shown in FIGS. 2 and 5) in which the latch pawl 32 is positioned to latchingly engage with the detent portion 46 of the latch plate 21 upon initial forward tilting of the backrest member in the direction of arrow B, as seen in FIGS. 5 and 6. In the preferred embodiment shown, the stop means 43 protrudes through a closed slot 45 positioned in the latch pawl 32, above the pivot aperture 35. This significantly simplifies the size and construction of the latching mechanism by eliminating the conventional need for two separate stop means positioned to engage outside edges of the latch pawl 32.

Figure 4:
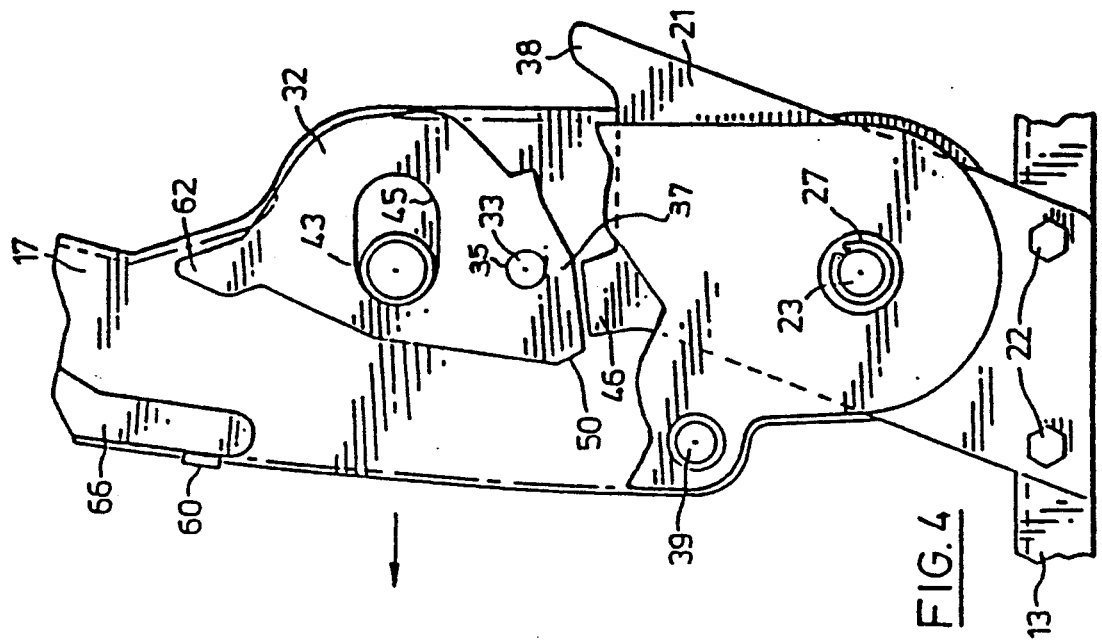
Figure 3:
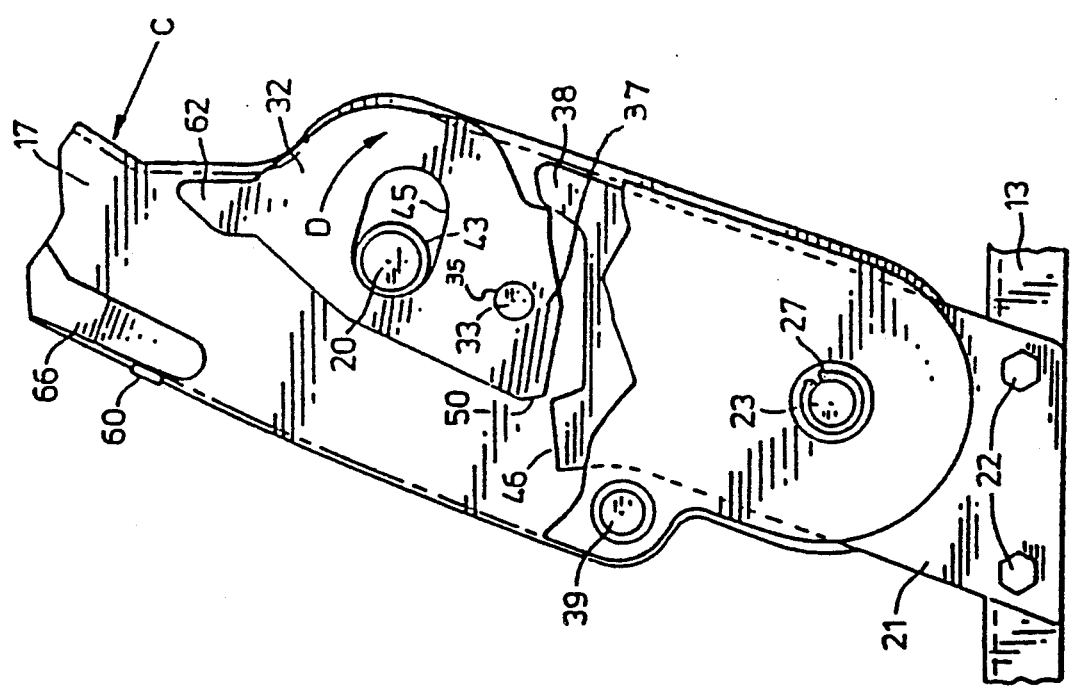

When the vehicle is at rest, or in a condition of constant velocity (i.e. 0 acceleration), the backrest member 12 assumes the normal upright position shown in FIG. 2. In such position, a ramp follower portion 48 of the latch pawl 32 frictionally interacts with the turkey spur 38 so as to pivot the latch pawl 32 towards the second limit position. In this manner, the second latch means 31 is pivoted to the second limit position, so as to be in a latching attitude with respect to the detent portion 46 of the latch plate 21. When a moderate forward tilting force is applied to the backrest member, for example by a user trying to gain access to the passenger compartment behind the front seat of a two door vehicle, the backrest member 12 moves, as seen in FIG. 3, forward in the direction of arrow C of that Figure, thereby causing the ramp follower portion 48 to slide down the terminal raised ramp portion 38. The force of gravity biases the latch pawl 32 in the direction of the arrow D of FIG. 3, thereby causing the latch pawl to move to the first limit position shown in FIG. 3. Continued forward movement of the backrest member under moderate tilting force, as shown in FIG. 4, results in the leading edge 50 of the latch pawl 32 clearing the detent portion 46 of the latch plate 21, thereby avoiding latching engagement with the first latch means 21.

Under the conditions of sudden vehicle deceleration, such as might occur, for example, in a crash situation, the seatback member 12 begins to tilt forward, as seen in FIG. 5, in the direction of arrow B of that Figure. However, unlike the situation involving moderate tilting forces, under the aforesaid conditions of rapid vehicle deceleration, the gravity biasing of the latch pawl 32 toward the first limit position is overcome by the inertial forces generated in the latch pawl 32 by the deceleration, such that the pawl pivots about the pivot pin 33 in the direction of the arrow E of FIG. 5 to the second limit position, whereat the leading edge 50 of the latch pawl 32 engages the detent portion 46 of the first latch means 21, so as to prevent continued forward tilting movement of the backrest member 12 over the seat member 11.

In the unlikely event of latch failure, or, in situations where the vehicle is parked on a substantial forward incline, as shown in FIG. 6, it is desirable to provide a manual release means 52 on the backrest member 12. The release means may simply comprise a cranked release lever 54 which is pivotally mounted about a shouldered bushing 56, held in place on the hinge plate 17 by means of the bolt 19 and a nut 57. A coil spring 58 surrounds a bushing 56 and biases the release lever 54 to a disengaged position defined by an overlying tab 60 formed on the hinge plate 17. As seen in FIG. 6, when the latch pawl 32 is in the fully engaged configuration, the release lever 54 can be made to frictionally interact with an upper arm portion 62 of the latch pawl 32 above the level of the pivot axis 33 so as to counter-pivot the latch pawl 32 from the second limit position shown in FIG. 5 to the first limit position shown in FIG. 6 to thereby releasingly disengage the latch pawl 32 from the detent portion 46, thus freeing the seatback 12 for further forward pivotal motion. It will be appreciated from FIG. 6 that to so manually release the latch pawl 32, a first arm portion 64 of the lever 54 is pushed in the direction of arrow F of FIG. 6, so as to cause a second arm portion 66 to pivot in the direction of arrow G of FIG. 6, causing the aforementioned frictional interaction with the latch pawl 32.

It will be understood by those skilled in the art that the invention is not to be limited to the exact construction shown and described, but that various changes and modifications may be made without departing from the spirit and scope of the invention as defined in the appended claims. For example, the precise positioning of the various pivot pins and fastening means can be significantly altered without affecting the operation of the illustrated latching device. Moreover, the first latch means, in the form of the latch plate 21, can itself be made to pivot about the hinge pin 23 in a controlled manner, as is well known in the art, so as to provide for adjustment of the normal upright position of the backrest member 12 to accommodate the seat occupants' preference. In this manner, the latching device of the present invention controls only the "dumping" feature of the backrest member 12, while a pivotal control mechanism for the latch plate 21 (not shown) would control the operative inclination of the backrest member 12. Various means of so controlling pivoting of the latch plate 21 are well known in the art, and their incorporation into the preferred embodiment illustrated would be readily accomplished by a person skilled in the art, so as not to constitute additional inventive subject matter hereover.

I claim:

1. In a vehicle seat assembly having a backrest member pivotally tiltable over a seat member, a backrest latching mechanism comprising:

a first latch means fixed relative to one of said members;

a second latch means pivotally mounted on the other of said members for pivotal movement about a pivot axis lying immediately adjacent to a lower edge of the second latch means so as to provide for pivotal movement of the second latch means between a first limit position in which the second latch means is positioned so as to avoid latching engagement with the first latch means upon forward tilting movement of the backrest member over the seat member and a second limit position in which said second latch means is positioned to latchingly engage with the first latch means upon initial forward tilting of the backrest member so as to prevent continued forward tilting movement of the backrest member over the seat member;

stop means mounted on the other of said members in interfering relation with the second latch means above the level of the pivot axis and adapted to interact with said second latch means to define said first and second limit positions;

wherein said stop means is mounted on the other of said members in operative protruding relation through a closed slot formed in the second latch means;

wherein the first latch means comprises a detent portion adapted to latchingly engage the second latch means when the latter is in the second limit position and a raised cam portion adapted, with the backrest member in the normal upright position, to register in contacting operative relation with a ramp follower portion of the second latch means so as to pivot the second latch means towards the second limit position into a latching attitude with respect to the detent portion;

whereby, in moderate operative manual forward tilting of the backrest member over the seat member, the second latch means is gravity biased to the first limit position; and, whereby, upon the occurrence of a vehicular deceleration force which is sufficient to overcome said gravity biasing of the second latch means to the first limit position and to cause said initial forward tilting of the backrest member over the seat member, the second latch means pivotally moves to the second limit position so as to prevent continued forward tilting movement of the backrest member as aforesaid.

2. A backrest latching mechanism according to claim 1 wherein the raised ramp portion is profiled to rise at its highest point to substantially the level of the pivot axis, when the backrest member is in its normal upright position.

3. A backrest latching mechanism according to claim 2, wherein the first latch means is fixed relative to the seat member and the second latch member is mounted on the backrest member.

4. A backrest latching mechanism according to claim 3, wherein manual release means are positioned on the backrest member and are adapted to frictionally interact with the second latch means above the level of the pivot axis so as to counter-pivot the second latch means from the second limit position towards the first limit position.

5. A backrest latching mechanism according to claim 4, wherein the first latch means is rotationally adjustable with respect to the seat member.

6. A backrest latching mechanism for use in a vehicle seat assembly having a backrest member pivotally tiltable over a seat member, said latching mechanism comprising:

a first latch means fixed relative to one of said members;

a second latch means pivotally mounted on the other of said members for pivotal movement about a pivot axis lying adjacent to a lower edge of the second latch means so as to provide when secured in combination with said vehicle seat assembly for pivotal movement of the second latch means between a first limit position in which the second latch means is positioned so as to avoid latching engagement with the first latch means upon forward tilting movement of the backrest member over the seat member and a second limit position in which said second latch means is positioned to latchingly engage with the first latch means upon initial forward tilting of the backrest member so as to prevent continued forward tilting movement of the backrest member over the seat member;

a closed slot formed in the second latch means above the level of the pivot axis and adapted to interact with a stop means mounted on the other of said members in operative protruding relation through said slot to define said first and second limit positions;

wherein the stop means comprises a steel pin and is mounted on the other of said members in operative protruding relation through a closed slot formed in the second latch means above the level of the pivot axis;

wherein the first latch means comprises a detent portion adapted to latchingly engage the second latch means when the latter is in the second limit position and a raised cam portion adapted, with the backrest member in the normal upright position, to register in contacting operative relation with a ramp follower portion of the second latch means so as to pivot the second latch means towards the second limit position into a latching attitude with respect to the detent portion;

whereby, with the mechanism secured in combination with said vehicle seat assembly, and upon moderate manual forward tilting of the backrest member over the seat member, the second latch means is gravity biased to the first limit position; and whereby, upon the occurrence of a vehicular deceleration force which is sufficient to overcome said gravity biasing of the second latch means to the first limit position and to cause said initial forward tilting of the backrest member over the seat member, the second latch means pivotally moves to the second limit position so as to prevent continued forward tilting movement of the backrest member as aforesaid.

7. A backrest latching mechanism according to claim 6 wherein the raised ramp portion is profiled to rise at its highest point to substantially the level of the pivot axis when the backrest member is in the normal upright position.

8. A backrest latching mechanism according to claim 7, wherein the first latch means is fixed relative to the seat member and the second latch member is mounted on the backrest member.

9. A backrest latching mechanism according to claim 8, wherein manual release means are positioned on the backrest member which means are adapted to frictionally interact with the second latch means above the pivot axis so as to counter-pivot the second latch means from the second limit position towards the first limit position.

10. A backrest latching mechanism according to claim 9, wherein the first latch means is rotationally adjustable with respect to the seat member.

* * * * *